No. 663,546. Patented Dec. 11, 1900.
W. F. JAENECKE.
REVERSING GEARING.
(Application filed Feb. 8, 1900.)
(No Model.)

Wilhelm F. Jaenecke
Inventor

Witnesses

UNITED STATES PATENT OFFICE.

WILHELM F. JAENECKE, OF BRADFORD, PENNSYLVANIA, ASSIGNOR OF ONE-HALF TO GEORGE L. ALLEN, OF SAME PLACE.

REVERSING-GEARING.

SPECIFICATION forming part of Letters Patent No. 663,546, dated December 11, 1900.

Application filed February 8, 1900. Serial No. 4,528. (No model.)

*To all whom it may concern:*

Be it known that I, WILHELM F. JAENECKE, a citizen of the United States, residing at Bradford, in the county of McKean and State of Pennsylvania, have invented a new and useful Reversing-Gearing, of which the following is a specification.

My invention relates to improvements in gearing of that class which employ fast and loose members on a single shaft and adapted to allow the latter to remain at rest or to be driven by the joint action of the members.

The primary object of this invention is to provide a gearing of this type which is adapted to drive the shaft in the same direction as the driving member or in an opposite direction thereto, whereby the shaft may be reversed through the medium of the clutch.

A further object is to simplify and improve the general construction of the device to the end that the several gear elements are housed or contained wholly within the members, so as to be protected from accumulations of dust and dirt, and, furthermore, to provide an improved external clutch mechanism which is powerful in action and easily operated or controlled.

Further objects and advantages will appear in the course of the subjoined description, and the novel combination of elements and construction of parts will be defined in the claims.

Figure 1:
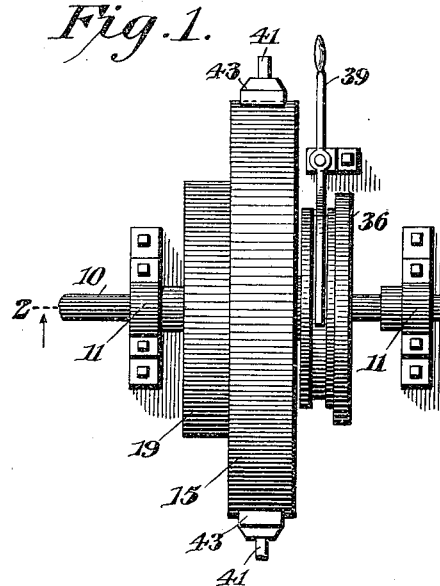
Figure 3:
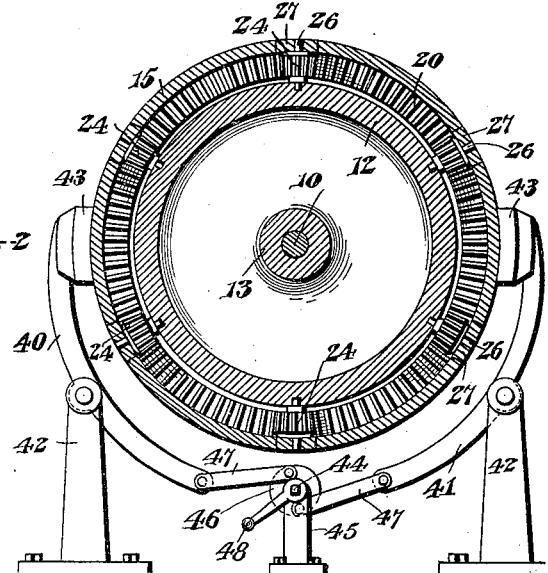
Figures 2, 5:
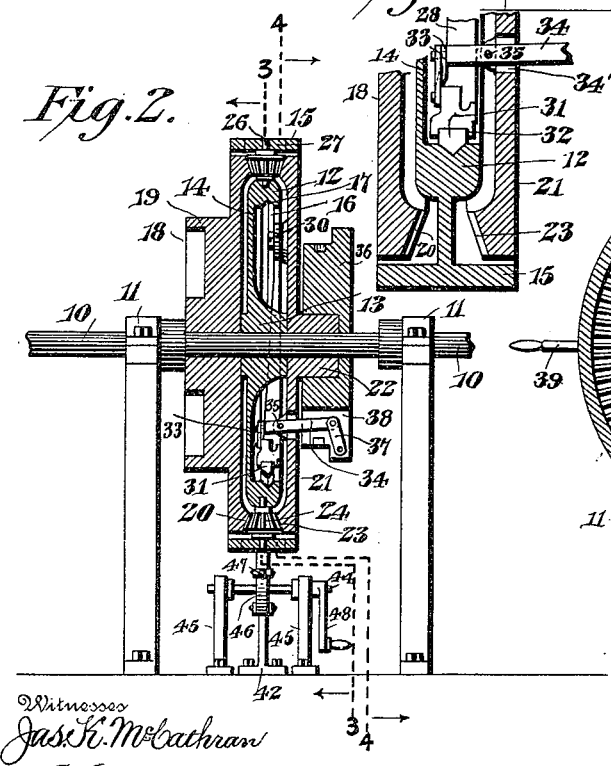
Figure 4:
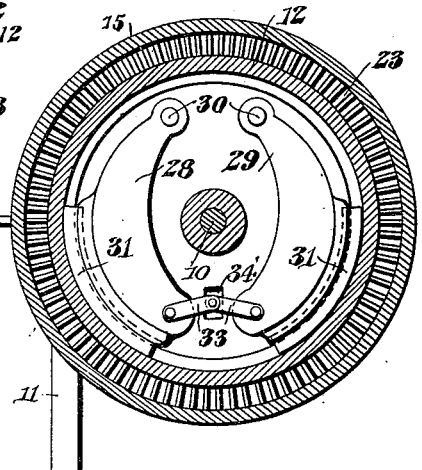

In the drawings, Figure 1 is a plan view of a clutch embodying my improvements. Fig. 2 is a vertical sectional view in the plane of the longitudinal axis of the shaft and indicated by the dotted line 2 2 on Fig. 1. Fig. 3 is a section at right angles to Fig. 2, taken in the plane of the dotted line 3 3 on Fig. 2 looking in the direction of the arrow. Fig. 4 is a view similar to Fig. 3, taken in the plane of the dotted line 4 4 on Fig. 2 looking in the direction of the arrow. Fig. 5 is an enlarged detail view similar to Fig. 2 of part of the clutch mechanism to more clearly illustrate the construction and arrangement of some of the parts thereof.

The same numerals of reference are used to indicate like and corresponding parts in each of the several figures of the drawings.

10 designates a horizontal shaft which is mounted in bearings 11 of any suitable character.

One member of the improved clutch is indicated by 12, and it consists of a hub 13, a web 14, and an annular rim 15, all made, preferably, in a single casting. This part 12 constitutes the central member of a three-part clutch, because it is arranged between two other members, which are respectively the driving and driven members of the clutch. This central clutch member has its hub 13 fitted loosely on the shaft 10, and in one face of the web 14, forming a part of said central member, is a recess 16, which forms an annular internal brake-surface 17, with which is adapted to engage the shoes of an internal brake mechanism, as will hereinafter appear.

The driving member of the clutch is indicated by the numeral 18, and it is mounted loosely on the shaft 10, so as to lie on one side of the transverse plane of the central member, a part of this driving member 18 being housed or contained within the rim 15 of the central member. The driving member is in the form of a disk having on its outer exposed side an annular band-surface 19, adapted to receive a belt which is driven from any suitable source of power for the purpose of positively rotating the driving member, said band-surface being offset laterally from the plane of the central member rim 15 in order that the belt may pass at all times around the same. The driving member is in opposing relation to the web 14 of the central member, and on the inner face of said driving member, near the periphery thereof, is an annular series of bevel-gear teeth 20, which are adapted to mesh simultaneously with a series of radially-disposed bevel gear-pinions 24.

The driven member 21 of the clutch is mounted on the shaft, so as to be fast therewith for the purpose of rotating the shaft when said driven member is rotated, and this driven member is disposed on the opposite side of the web forming a part of the central member from the loosely-mounted driving member 18. The driven member is provided with a hub 22, which may be keyed to the shaft, and said member is in opposing relation to the web of the central member. Furthermore, said driven member lies within the plane of the rim of the central member, and on the inner face of this driven member, near the periphery thereof, is an annular series of bevel-gear teeth 23, which are similar to the bevel-gear teeth on the driving member.

The series of bevel gear-pinions 24 are disposed between the driving and driven members, so as to intermesh directly with the gear-teeth thereon, and the pinions constituting said annular series are spaced at proper intervals apart and disposed radially to the axis of the shaft, as shown by Fig. 3. Each pinion is fitted in an opening provided in the web of the central member beyond the recess 16 thereof, and each pinion is provided with a shaft 26, the inner end of which finds a bearing in the solid part of the web, which constitutes an element of the central member. The opening in which the pinion is arranged extends through the rim 15, and said opening is closed by a plate or block 27, which is secured in the rim, so as to lie flush with the outer circular face thereof. It will thus be seen that the radially-disposed pinions are mounted in and carried by the clutch member 12 and that the driving member is geared to the pinions on one side, while the driven member is likewise geared to the pinions on the other side thereof, whereby under some conditions of service the pinions transmit the motion of the driving member to the driven member.

It will be understood that the central member of my reversing-clutch is mounted idly on the shaft, as is also the driving member. As will hereinafter appear, it is desirable under some circumstances to effect a rigid connection between certain elements—that is to say, the central and driven members—and to effect such connection I employ clutch mechanism which is carried by the driven member in position to operatively engage the annular friction-surface 17, heretofore referred to. In my device two friction-clutch mechanisms are employed, as will hereinafter appear, one clutch mechanism serving to make the central member fast with the driven member, as before recited, and the other clutch mechanism serving to hold the central member 12 in a fixed position with relation to both the driving and driven members. In order to distinguish the clutch which holds the central member fast with the driven member from the other clutch mechanism, I will hereinafter term the first-named clutch an "internal" clutch, while the last-named brake mechanism may be designated as the "external" clutch mechanism. This internal clutch includes a pair of levers 28 29, (see Fig. 4,) which are curved so as to lie on opposite sides of the shaft, each lever being fulcrumed at one end, as at 30, to the inner face of the driven member. These levers are contained in the recessed portion 16 of the central member and a pair of clutch-shoes 31 are fitted in segmental recesses 32 and the levers, said clutch-shoes being of segmental form to conform to the annular friction-surface 17 of the central member web 14. I prefer to provide the clutch-surface 17 in the form of a groove V-shaped in cross-section and to correspondingly fashion the working faces of the clutch-shoes in order to secure a maximum frictional resistance. Links 33 are pivoted individually to the free ends of the levers, and these links are connected at a common point to the inner end of an operating-lever 34, which passes through an opening 34' in the member 21. Said lever is fulcrumed at 35 to the member 21 and its protruding end is received in a recess 38, which is provided in a collar 36, the latter being slidably fitted on the hub 22 of the driven member. (See Fig. 2.) The collar is operatively connected with the free end of the lever by a link 37 and the movement of the collar in one direction operates the lever to apply the shoes, while a reverse movement retracts the shoes through the lever. Any suitable means may be provided in lieu of the collar and lever for the operation of the internal clutch. The slidable collar may be shifted by a manually-operated lever 39, which is arranged to work in a grooved part of the collar. (See Figs. 1 and 2.) The external clutch mechanism which serves to lock the central clutch member against rotation comprises a pair of levers 40 41, arranged on opposite sides of the longitudinal vertical axis of the clutch. Each lever is fulcrumed at a point intermediate of its length on a fixed post 42 and on the upper ends of the levers are provided the clutch or brake-shoes 43, arranged to frictionally engage with the rim of the central clutch member. An operating-shaft 44 is journaled in proper bearings 45, situated between the lower ends of the levers, and this shaft is provided with a crank-disk 46. The lower ends of the levers and the crank-disk are connected operatively together by the links 47, each of which is pivoted at one end to a lever, while the other ends of the pair of links are pivoted to the crank-disk at diametrically opposite points thereof. The operating-shaft for the external clutch may be turned or rocked by any suitable device, such as by a crank 48, and, if desired, means may be provided for locking the shaft against turning, so that the clutch will remain in its applied position without attention. It is evident that an axial movement of the shaft in one direction operates to turn the crank-disk which moves the links to effect the simultaneous operation of the levers and a like application of the clutch or brake-shoes to the rim 15; but by reversing the shaft the parts are actuated to withdraw said shoes simultaneously from engagement with the rim.

In operation when it is desired to actuate the driven element in the direction of movement of the driving element the collar 36 is shifted by means of the lever 39 to effect the actuation of the internal clutch, thereby rendering the driven member and the central member interdependent or relatively fixed. The driving element, which is mounted loosely on the shaft, as heretofore stated, will now by reason of its connection with the pinions effect the synchronous rotation of the driven member. If, however, it is desired to reverse the movement of the driven member—that is to say, to effect its rotation in a direction opposite to the rotation of the driving member—the internal clutch is released to permit the driven member to move independently of the central member. The external clutch is then applied to retain the central member immovable, and rotation of the driving member will through the interposition of the pinions effect a reverse rotation of the driven member. The release of both the internal and external clutches will render the device negative or inactive so far as the communication of motion from the driving to the driven element is concerned.

The gear-pinions may bear any suitable proportions to the gear-formed driving and driven members of the clutch, and in one embodiment of the invention I have found it practicable to make the proportions of these parts as one to six.

Although I have shown and described the member 18 as the driving member and the member 21 as the driven member for the purpose of propelling the shaft in one direction or the other through the medium of the clutch, which thus serves as a reversing-gear, it is perfectly obvious that this relation of the parts may be reversed without in any way modifying or changing the principle of construction or mode of operation of my improved clutch. Such reversal of the parts of the clutch is especially advantageous when the improved construction is applied to and used in connection with a gas engine or other motor in which the shaft is continuously operated or rotated irrespective of the machine which is driven from the gas-engine or motor. Under these conditions the member 21 becomes the driving member, because it is fast with the shaft, while the other member 18 constitutes the driven member, having a belt-surface 19 or other power-transmitting appliance for the purpose of enabling the belt, sprocket-chain, or other mechanical contrivance to transmit the motion from this member 18 to the machine which is driven by the engine.

One of the important advantages of my improved clutch resides in the fact that the clutch may be thrown into and out of gear and reversed when running at a high speed, because the internal clutch mechanism may be brought into service gradually for the purpose of frictionally engaging with the intermediate member, whereby the clutch may be started and reversed without in any wise involving injury to the gears or stripping the teeth thereof.

Changes within the scope of the appended claims may be made in the form and proportion of some of the parts, while their essential features are retained and the spirit of the invention is embodied. Hence I do not desire to be limited to the precise form of all the parts, as shown, reserving the right to vary therefrom.

Having thus described the invention, what I claim is—

1. The combination with driving and driven members, of an intermediate member, gears carried by the intermediate member in operative relation to the driving and driven members, an internal clutch carried by the driven member and located entirely within the intermediate member, and a rotary actuating device exterior to the driven member, and means for operatively connecting the rotary actuating device with the internal clutch.

2. The combination with driving and driven members, of an intermediate member, gears carried by the intermediate member in operative relation to the driving and driven members, an internal clutch located within the plane of one side face of the intermediate member, and an internal clutch-actuating device extended through the driven member to the exterior thereof.

3. The combination with a shaft, a driving member loosely mounted thereon, a driven member fixed to the shaft, and an intermediate member carried by the shaft and comprising a recessed web, a rim encircling the peripheries of the driving and driven members, and gears intermediate of the web and rim and meshing with the driving and driven members, of an external clutch in operative relation to the rim, an internal clutch carried upon the inner side face of the driven member and located within the recess in the web of the intermediate member, and means upon the exterior of the driven member for actuating the internal clutch.

4. The combination with a shaft, a driving member, a driven member, an intermediate member provided with an annular recess opposed to, and closed by, the inner side wall of the driven member, a clutch operatively related to the intermediate member and designed to retain it against movement, an internal clutch located within the annular recess of the intermediate member and supported by the driven member, a slidable collar exterior to the driven member, and an operating-lever passed through the driven member and operatively connected to the internal clutch and to the sliding collar, respectively.

5. The combination of a shaft, driving and driven members on said shaft, an intermediate member provided with a rim and carrying gear-pinions which mesh with the driving and driven members, an internal clutch mechanism arranged to make the intermediate member fast with the driven member, a pair of clutch-levers provided with shoes disposed to frictionally engage externally with the rim of the intermediate member, a shaft having a crank-disk, and links connecting said crank-disk with the pair of levers, substantially as described.

In testimony that I claim the foregoing as my own I have hereto affixed my signature in the presence of two witnesses.

WILHELM F. JAENECKE.

Witnesses:
　GEORGE L. ALLEN,
　WILLIAM DOBIE.